United States Patent [19]

Pfeifer

[11] Patent Number: 5,673,587
[45] Date of Patent: Oct. 7, 1997

[54] DEVICE WITH A PNEUMATICALLY LEVITATED SENSOR FOR MEASURING THE FILL LEVEL OF A CONTAINER

[75] Inventor: Jürgen Pfeifer, Nussloch, Germany

[73] Assignee: Heidelberger Druckmaschinen AG, Heidelberg, Germany

[21] Appl. No.: 636,190

[22] Filed: Apr. 22, 1996

[30] Foreign Application Priority Data

Apr. 20, 1995 [DE] Germany ............ 195 14 566.6

[51] Int. Cl.$^6$ ............................................. G01F 23/24
[52] U.S. Cl. ............................................. 73/314; 73/313
[58] Field of Search ............ 73/305, 313, 314, 73/316, 317, 319, 306, 307; 266/95; 164/156.1, 450.1

[56] References Cited

U.S. PATENT DOCUMENTS 3,459,042  8/1969  Brown ............................ 73/313
4,567,935  2/1986  Takeda et al. ................ 164/250.1
4,641,523  2/1987  Andreasson .................... 73/313
4,724,705  2/1988  Harris ............................ 73/313

FOREIGN PATENT DOCUMENTS 1225679  4/1986  U.S.S.R. ...................... 164/450.1

Primary Examiner—Richard Chilcot
Assistant Examiner—Paul D. Amrozowicz
Attorney, Agent, or Firm—Herbert L. Lerner; Laurence A. Greenberg

[57] ABSTRACT

Device for measuring a fill level of a container by means of a measuring sensor which is vertically adjustable contingent upon a surface level of liquid in the container, and which is connected to a travel-distance pickup, includes a source of compressed air directed towards the surface level and acting upon the measuring sensor so as to hold a lower end of the measuring sensor suspended at a defined distance above the surface level.

7 Claims, 1 Drawing Sheet

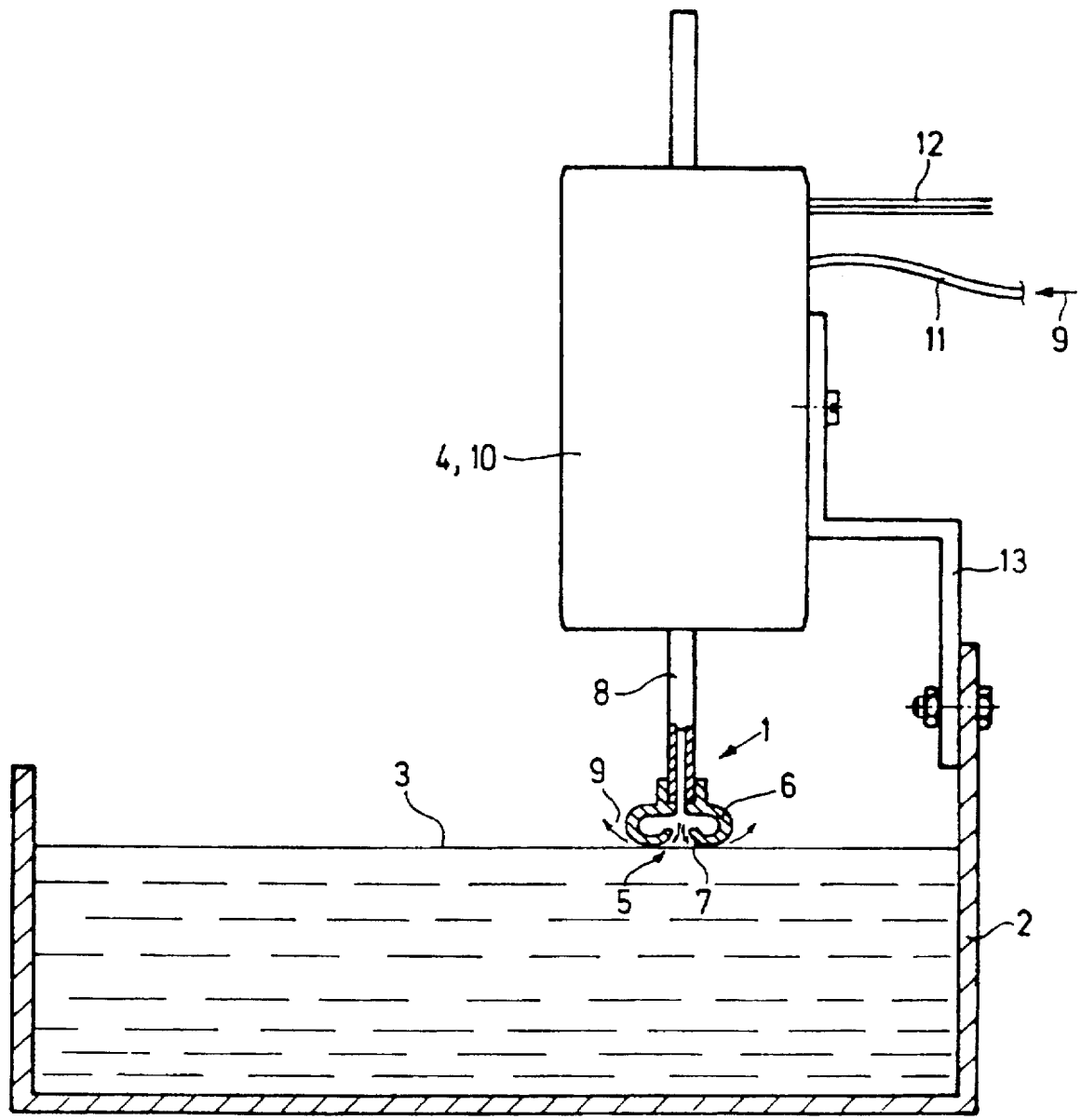

DEVICE WITH A PNEUMATICALLY LEVITATED SENSOR FOR MEASURING THE FILL LEVEL OF A CONTAINER

BACKGROUND OF THE INVENTION

Field of the Invention

The invention relates to a device for measuring the fill level of a container by means of a measuring sensor which is vertically adjustable contingent upon the liquid level and which is connected to a travel-distance pickup.

Various devices have become known heretofore for measuring the fill level of containers. The fill level can be detected, for example, by ultrasonic measurement or optically. However, a disadvantage thereof is high cost and, when the fill level of sticky liquids is measured optically, there is a danger that the liquid will stick to the measuring elements. Another option for fill level measurement is to detect the liquid level by means of a float. This measuring method again has the disadvantage that, with sticky or gummy liquids, the float will become gummy and encrusted, so that the accuracy of the measurement is no longer assured.

SUMMARY OF THE INVENTION

It is accordingly an object of the invention to provide a device for measuring the fill level of a container of the type referred to at the introduction hereto which has been improved so that, in a relatively simple manner, reliable functioning and high measurement accuracy are attained therewith.

With the foregoing and other objects in view, there is provided, in accordance with the invention, a device for measuring a fill level of a container by means of a measuring sensor which is vertically adjustable contingent upon a surface level of liquid in the container, and which is connected to a travel-distance pickup, comprising a source of compressed air directed towards the surface level and acting upon the measuring sensor so as to hold a lower end of the measuring sensor suspended at a defined distance above the surface level.

In accordance with another feature of the invention, the lower end of the measuring sensor has a cuplike formation.

In accordance with a further feature of the invention, the cuplike formation is formed of elastic material.

In accordance with an added feature of the invention, cuplike formation has an inwardly curved edge.

In accordance with an additional feature of the invention, the measuring sensor comprises a vertically displaceable tube for supplying the compressed air therethrough.

In accordance with yet another feature of the invention, the device includes a potentiometer connected to the measuring sensor, for receiving therefrom an electrical signal analogous to travel distance generated thereby.

In accordance with yet a further feature of the invention, the device includes a structure connected to the tube and communicating with the compressed air source, the structure defining an air bearing vertically displaceably supporting the measuring sensor.

In accordance with yet an added feature of the invention, the vertically displaceable tube is closed at the top and, in vicinity of the air bearing, is formed with at least one opening for applying compressed air.

In accordance with a concomitant aspect of the invention, the device is in combination with a printing press having a varnishing unit, and the container is a varnish tub of varnishing unit of the printing press, the device being mounted for measuring the fill level in the varnish tub.

By means of the device of the invention, contact-free measurement is attainable, wherein errors due to gumminess, encrustation or adhesion of the liquid or other fluidic material are avoided. Any wetting of the measuring element whatsoever is precluded in this way. The device is very simple in construction and design, and requires only a very slight amount of compressed air. The filling quantity can be detected at any stage, both when the container is empty or full. The fill level measurement can be performed for any liquid and most other fluidic materials, even such proble-matic materials as varnishes and inks.

A further feature of the invention is that the lower end of the measuring sensor has a cuplike formation. In this way, an air cushion is created, by which the measuring sensor is held suspended a very slight distance above the liquid. This creation of an air cushion can be improved further by providing that the cuplike formation be formed of elastic material. It is also advantageous, in this sense, for the cuplike formation to have an inwardly curved edge. The compressed air can be supplied to the cuplike formation, for example, by means of a flexible air hose. However, it is advantageous for the measuring sensor to have a vertically displaceable tube through which the supply of compressed air is furnished. In this way, impairment of the vertical motion by the air hose is precluded.

The travel-distance detection can be performed by providing that the measuring sensor, for the purpose of generating an electrical signal analogous to the travel distance, be connected to a potentiometer.

A particularly easy-moving bearing of the measuring sensor for accurate measurement and economical use of compressed air is attained by providing a vertically displaceable support of the measuring sensor by means of an air bearing. Such an embodiment may also be constructed by closing the vertically displaceable tube at the top and, in the vicinity of the air bearing, providing at least one opening for applying the compressed air. In this manner, compressed air is supplied rather simply without exerting any influence whatsoever on the vertical mobility of the measuring sensor.

As noted hereinbefore, the device according to the invention is suitably used, with the aforementioned advantages, especially for measuring the fill level in varnish tubs of printing-press varnishing units.

Other features which are considered as characteristic for the invention are set forth in the appended claims.

Although the invention is illustrated and described herein as embodied in a device for measuring the fill level of a container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing.

BRIEF DESCRIPTION OF THE DRAWING

The single FIGURE of the drawing is a diagrammatic side elevational view, partly in section, of an exemplary embodiment of a device for measuring the fill level of a container in accordance with the invention.

DESCRIPTION OF THE PREFERRED EMBODIMENTS

Referring now to the FIGURE of the drawing, there is shown therein a container 2, wherein a surface level 3 of a liquid or other fluidic material is to be detected. For that purpose, a vertically movable measuring sensor 1 is provided. The measuring sensor 1 is mounted in a travel-distance pickup 4 which, by way of example, embodies a potentiometer 10. The travel-distance pickup 4 is secured to the container 2 by means of a retaining bracket 13, so that a lower end 5 of the measuring sensor 1 can move from a maximum or highest fill level down to the bottom of the container 2. The measuring sensor 1 is constructed as a vertically displaceable tube 8, through which it is to apply compressed air. In this regard, the compressed air is supplied to the tube 8 by means of an air supply line 11, for example, in a manner that the tube 8 is supported by an air bearing and that suitable openings assure the application of air from the tube 8. To that end, the tube 8 must be closed at the top thereof. At the lower end 5 of the measuring sensor 1, there is a cuplike formation 6, which is advantageously formed of elastic material, and has an inwardly curved edge 7. In this way, a very good air cushion is produced by the compressed air 9, and only little of the compressed air 9 escapes, which provides for a quite economical consumption. Depending upon whether the liquid level 3 is dropping or rising, the measuring sensor 1 follows the liquid level 3 and transmits information regarding the movement thereof to the potentiometer 4 acting as a travel-distance pickup 10. The potentiometer generates an electrical signal which is analogous to the travel distance, and the signal is transmitted via a line 12 onward, for example, to a control panel of a machine, such as a printing press, or to a data processing system.

I claim:

1. Device for measuring a fill level of a container by means of a measuring sensor which is vertically adjustable contingent upon a surface level of liquid in the container, and which is connected to a travel-distance pickup, comprising a source of compressed air directed towards the surface level and acting upon the measuring sensor so as to hold a lower end of the measuring sensor suspended at a defined distance above the surface level, measuring sensor comprising a vertically displaceable tube for supplying the compressed air therethrough, and a structure connected to said tube and communicating with the compressed air source, said structure defining an air bearing vertically displaceably supporting the measuring sensor, said vertically displaceable tube being closed at the top and, in vicinity of said air bearing, being formed with at least one opening for applying compressed air.

2. Device according to claim 1, wherein said lower end of the measuring sensor has a cuplike formation.

3. Device according to claim 2, wherein said cuplike formation is formed of elastic material.

4. Device according to claim 2, wherein said cuplike formation has an inwardly curved edge.

5. Device according to claim 1, including a potentiometer connected to the measuring sensor, for receiving therefrom an electrical signal analogous to travel distance generated thereby.

6. Device according to claim 1 in combination with a printing press having a varnishing unit, wherein the container is a varnish tub of the printing press, and the device is mounted for measuring the fill level in the varnish tub.

7. A measuring assembly for measuring a liquid level in a container, comprising:

a container for receiving a liquid therein, said container having a container wall;

a device for measuring a fill level of the liquid in said container, said device being rigidly attached to said wall of said container, and said device including:

a compressed air source, a tube pneumatically communicating with said air source, said tube having a lower end, extending substantially vertically and being axially displaceable, a travel-distance pickup disposed adjacent said tube for measuring an axial displacement of said tube; and a pneumatically acted-upon measuring sensor disposed at said lower end of said tube, said measuring sensor receiving compressed air through said tube such that a lower end thereof is held at a defined distance above the liquid and said travel-distance pickup registers a change in the fill level of the liquid via a displacement of said tube.

* * * * *